United States Patent [19]

Ishida et al.

[11] Patent Number: 4,760,546
[45] Date of Patent: Jul. 26, 1988

[54] TAG CONTROL CIRCUIT FOR INCREASING THROUGHPUT OF MAIN STORAGE ACCESS

[75] Inventors: Miyuki Ishida; Takashi Chiba, both of Kawasaki, Japan

[73] Assignee: Fujitsu Limited, Kawasaki, Japan

[21] Appl. No.: 746,536

[22] Filed: Jun. 19, 1985

[30] Foreign Application Priority Data

Jun. 22, 1984 [JP] Japan .............................. 59-128621
Jun. 22, 1984 [JP] Japan .............................. 59-128617

[51] Int. Cl.[4] .............................................. G06F 13/00
[52] U.S. Cl. .................................................... 364/200
[58] Field of Search ... 364/200 MS File, 900 MS File

[56] References Cited

U.S. PATENT DOCUMENTS 4,370,710 1/1983 Kroft .................................... 364/200
4,637,024 1/1987 Dixon et al. ......................... 364/200

Primary Examiner—Raulfe B. Zache
Assistant Examiner—Michael J. Ure
Attorney, Agent, or Firm—Staas & Halsey

[57] ABSTRACT

A tag control circuit is provided in a memory access control apparatus of a digital computer system which also includes a central processor having a buffer storage. The tag control circuit includes a tag information store and update circuit and a necessity operation circuit for determining whether invalidation of the tag information and whether transmission of an invalidation information to the central processor are necessary. The tag control circuit also includes a first storage for storing a plurality of access requests of the invalidation operation determined by the necessity operation circuit, a second storage for storing a plurality of invalidation execute information determined by the necessity operation circuit, and a selection circuit receiving a new access request and an access request stored in the first storage and outputting one access request. The tag control circuit may further include a third circuit storage for storing only store access requests before supplying them to the necessity operation circuit, the third storage having an output connected to the request receiving and outputting circuit. The access selection circuit may output one request at a time the following priority order: a new read access request before an access request stored in the first storage and either before a store access request stored in the third storage.

9 Claims, 12 Drawing Sheets

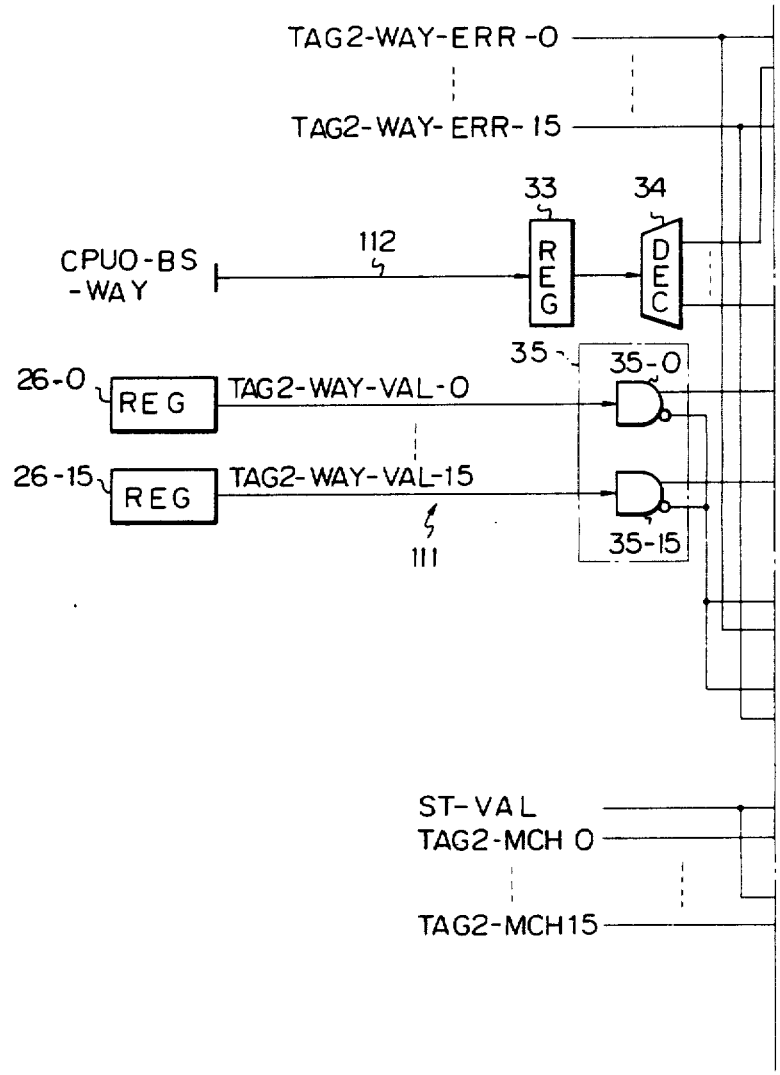

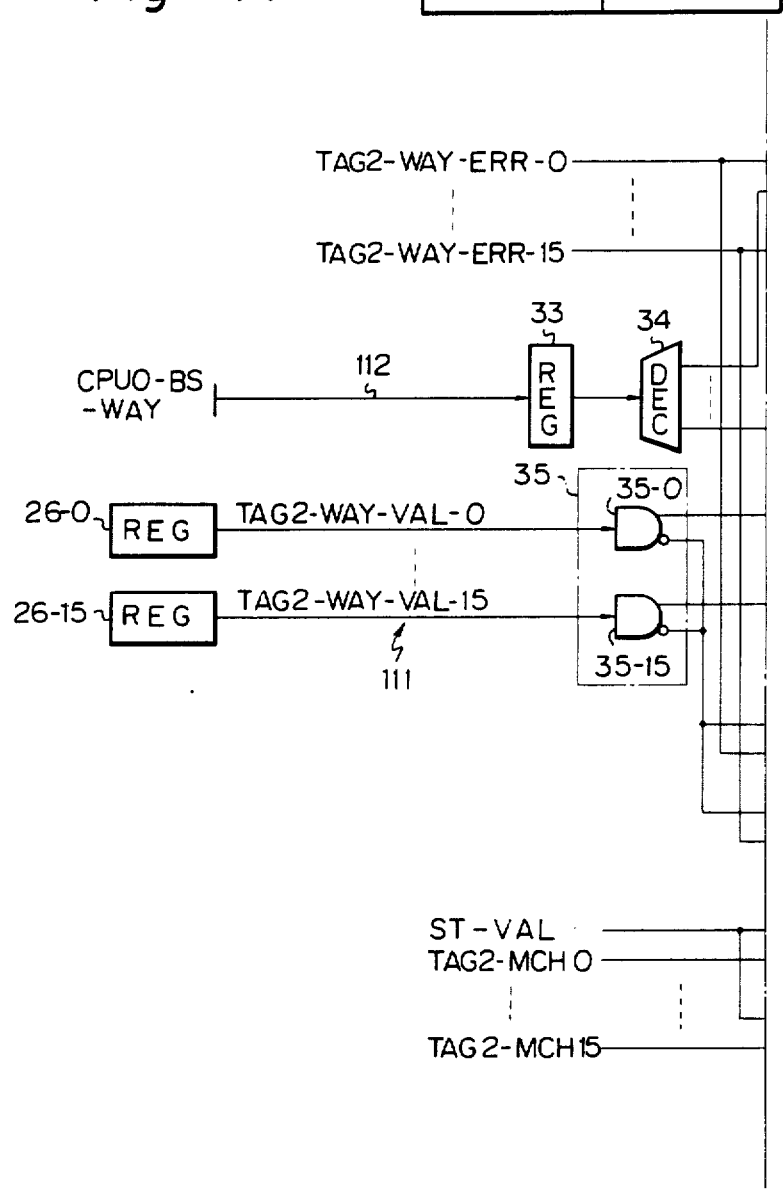

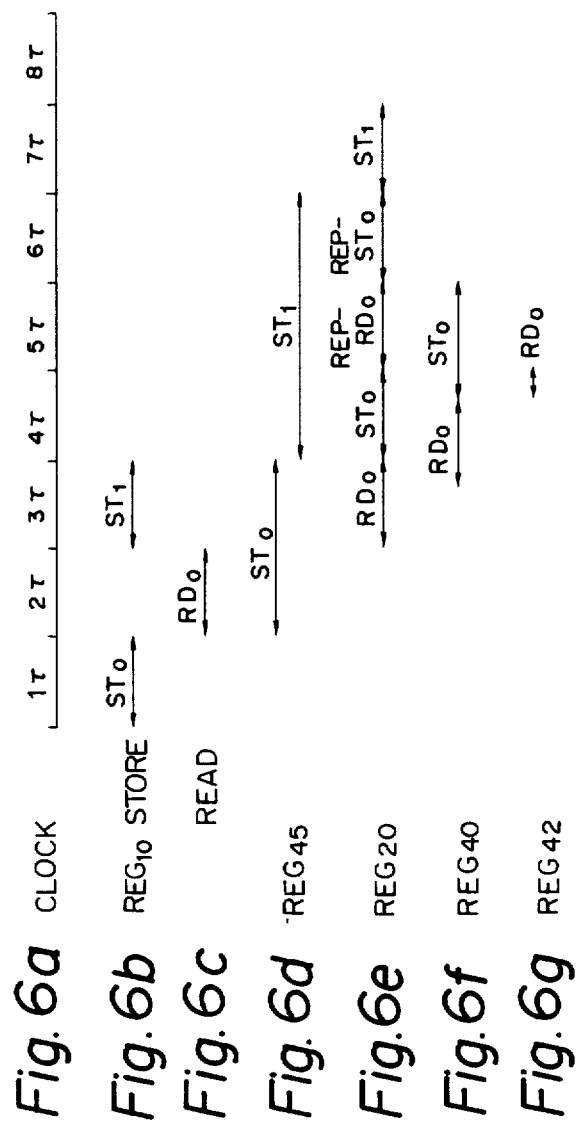

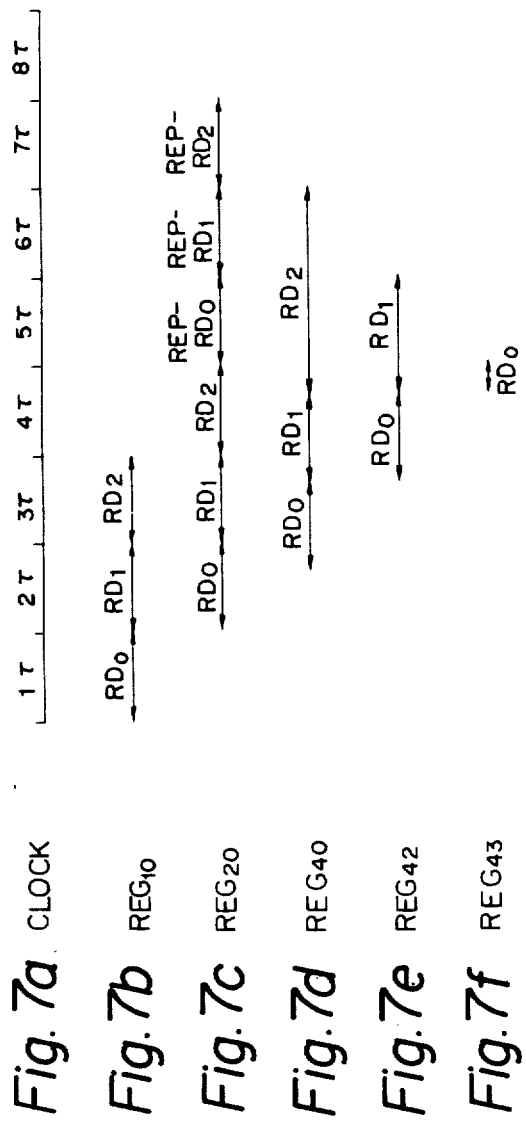

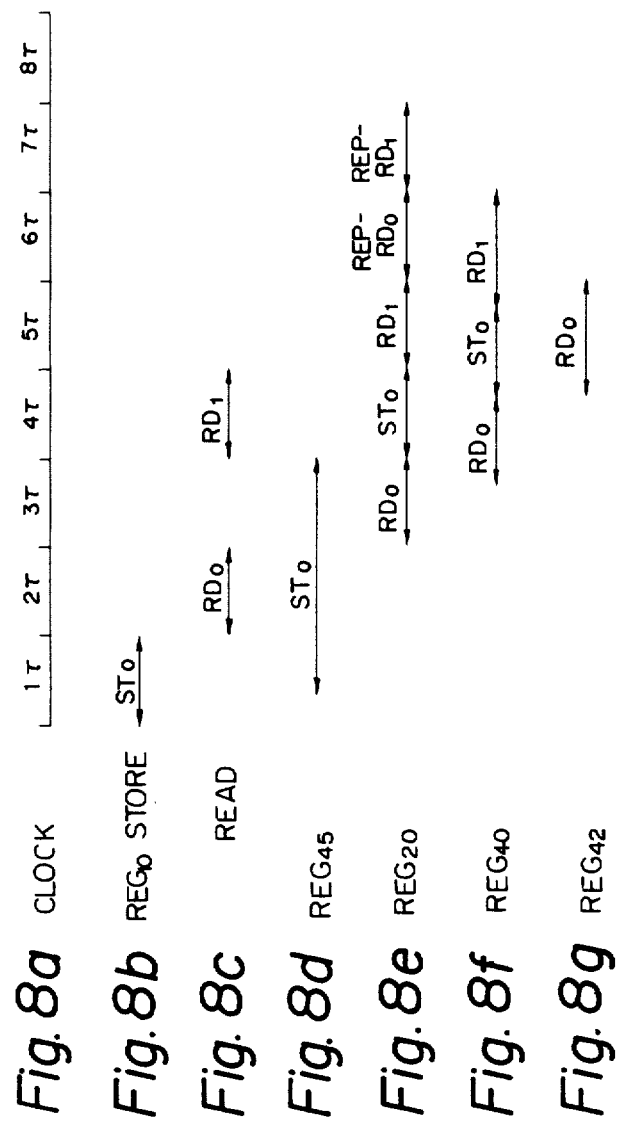

| Fig. 9A | Fig. 9B |

TAG CONTROL CIRCUIT FOR INCREASING THROUGHPUT OF MAIN STORAGE ACCESS

BACKGROUND OF THE INVENTION

1. Field of the Invention

The present invention relates to a digital computer system, more particularly to a tag control circuit in a memory access control apparatus provided between a main storage and one or more central processors having a buffer storage therein, the memory apparatus controlling memory access requests to the main storage and operating on tag information for the buffer storage.

2. Description of the Related Art

In a digital computer system including central processor(s), a main storage, and a memory access control apparatus provided between the central processor(s) and the main storage, each central processor is commonly provided with a buffer storage having a considerably faster access time than the main storage, but having a considerably smaller memory capacity.

The central processor can directly access data stored in its buffer storage, which may be identical to that in the main storage, without an access request to the main storage through the memory access control apparatus. This improves the data access time in the central processor.

The data in the buffer storage, which may be frequently used in the central processor, is previously transferred from a certain area in the main storage to an area in the buffer storage in response to an access request from the central processor. The data in the buffer storage may be updated and may also be returned to the main storage upon transfer of new data to the same area of the buffer storage.

In order to manage use of the buffer storage, first and second tag control circuits are provided. The first tag control circuit is provided in the central processor and is called "TAG1". The second tag control circuit is provided in the memory access control apparatus and is called "TAG2". The present invention essentially relates to the second tag control circuit TAG2.

The prior art, which will be explained later in detail with reference to the drawings, suffers from unnecessary communication between the central processor and the memory access control apparatus for managing the buffer memory storage, with a resultant reduction of the performance of the central processor.

The prior art also suffers from poor reliability of judgement of invalidation in the second tag control circuit TAG2 for a faulty data block of the buffer storage, which will be explained in more detail with reference to a specific example.

SUMMARY OF THE INVENTION

It is an object of the present invention to provide a tag control circuit in a memory access control apparatus for managing a buffer storage which can reduce unnecessary communication between the central processor and the memory access control apparatus for management of the buffer storage.

It is another object of the present invention to provide a tag control circuit in a memory access control apparatus which can improve the availability of the data blocks of the buffer storage.

According to the present invention, there is provided a tag control circuit in a memory access control apparatus in a digital computer system including a central processor and a main storage. The central processor includes a buffer storage for temporarily storing data for use by the central processor and an internal tag control circuit for managing the status of the buffer storage. The memory access control apparatus, processes access requests to the main storage and is provided between the central processor and the main storage. The tag control circuit includes a circuit for storing and updating tag information indicating the status of the buffer storage and a necessity operation circuit for determining whether an invalidation operation for invalidation of the tag information and whether transmission of invalidation information to the central processor are necessary. Also included in the tag control circuit are a first storing circuit for storing a plurality of access requests of the invalidation operation determined by the necessity operation circuit and a second storing circuit for storing a plurality of invalidation execute information determined by the necessity operation circuit, corresponding to the access requests stored in the first storing circuit. A selection circuit in the tag control circuit receives a new read access request and the access requests stored in the first storing circuit and outputs one access request from the above received requests to the necessity operation circuit in accordance with a predetermined priority order.

The tag information storing and updating circuit effects an invalidation operation or a transmission operation of the invalidation information to the central processor in response to information determined by the necessity operation circuit and information stored in the second storing circuit.

Preferably, the tag information storing and updating circuit may include a plurality of registers, having a number equal to a number of data blocks in the buffer storage. The necessity operation circuit would then include a plurality of circuits for determining appropriate invalidation of operations. The number of circuits in the necessity operation circuit would equal the number of registers in the tag information storing and updating circuit. The second storing circuit would also include the same number of registers as that of the tag information storing and updating circuit.

The first storing circuit may include a plurality of steps of registers with each step containing the same number of regsiters as the tag information storing and updating circuit. The second storing circuit may also include the same number of steps of registers. In both the first and second storing circuits, the steps are connected in series with the registers connected in parallel registers in preceding and following steps. The first and second storing circuit may be operated at synchronous timings. Preferably, the number of the steps of registers in the first storing circuit is defined by the number of read access requests output consecutively in a predetermined period.

Preferably, the tag control circuit may further include a third circuit for storing only store access requests to the main storage before supplying them to the necessity operation circuit. An output of the third circuit is connected to the access request receiving and outputting circuit for this purpose.

The access request receiving and outputting circuit may preferably output one access request defined by the following priority order: the new read access request, the access request stored in the first storing circuit, and the store access request stored in the third storing circuit.

Preferably, the tag control circuit may further include a circuit for adding redundancy to error discrimination. The redundancy adding circuit may include a counter for counting errors of the buffer storage. The redundancy adding circuit outputs an invalidation signal when the counted value exceeds a predetermined value during a predetermined period.

BRIEF DESCRIPTION OF THE DRAWINGS

Other objects and features of the present invention will be described below in detail with reference to the accompanying drawings, in which:

FIG. 3 comprising FIGS. 3A and 3B, is a circuit diagram of a replace control circuit in the tag control circuit of the prior art;

FIG. 5, comprising FIGS. 5A and 5B is a circuit diagram of a first embodiment of the replace control circuit in the tag control circuit in FIG. 4;

FIGS. 6a to 6g are timing charts illustrating an operation mode of the tag control circuit 300' in FIG. 4;

FIGS. 7a to 7f are timing charts illustrating another operation mode of the tag control circuit 300' in FIG. 4;

FIGS. 8a to 8g are timing charts illustrating still another operation mode of the tag control circuit 300' in FIG. 4;

DESCRIPTION OF THE PREFERRED EMBODIMENTS

Before describing a preferred embodiment of the present invention, an explanation will be given of the basic construction and operation of a digital computer system which can include circuits in accordance with the present invention.

Figure 1:
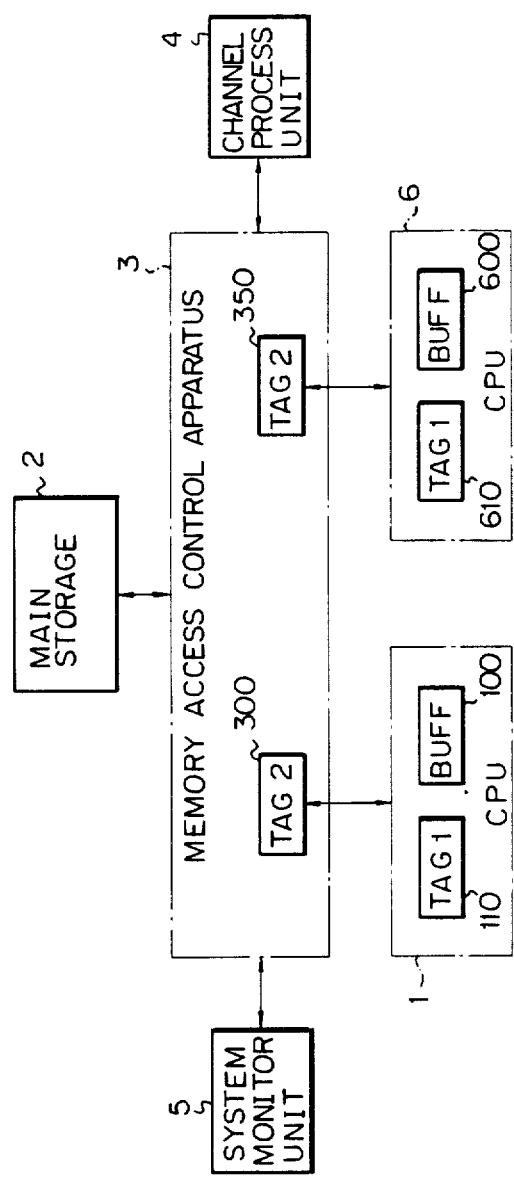
FIG. 1 is a block diagram of a digital computer system including a memory access control apparatus having a tag control circuit in accordance with the present invention.

FIG. 1 is a block diagram of the digital computer system. In FIG. 1, the computer system includes two sets of parallel operating central processors (CPU) 1 and 6, a main storage 2, a main storage access control apparatus 3, a system monitoring unit 5, and a channel processing unit 4. The main storage 2 includes a plurality of memory cells of, for example, a semiconductor static random-access-memory (RAM) type. The channel processing unit 4 controls the input and/or output devices. The system monitoring unit 5 monitors the status of the computer system and serves to correct errors in the computer system.

The central processors 1 and 6, the system monitoring unit 5, and the channel processing unit 4 transmit commands for memory access to the main storage access control apparatus 3 to access data in the main storage 2.

In the following description, the memory access for only the central processor 1 will be explained. The central processor 6, which may be operated in parallel with the central processor 1 by a pipeline operation system, has a similar construction to that of the central processor 1. Thus, the basic operation of the central processor 6 is similar to that of the central processor 1.

The central processor 1 has a buffer storage 100 and a first tag control circuit (TAG1) 110. The buffer storage 100 includes a plurality of memory cells, which typically have a faster access time than the main storage 2 and may be directly accessed from the central processor 1. The buffer storage 100, however, has a smaller memory capacity than the main storage 2, with a resultant requirement of frequent transfer of data between the buffer storage 100 and the main storage 2.

When the data to be used in the central processor 1 is stored in an area in the buffer storage 100, the central processor 1 uses the data in the buffer storage 100 without transmitting an access request to the main storage 3 through the memory access control apparatus 3. On the other hand, when the data to be used in the central processor 1 is not stored in any area in the buffer storage 100, the central processor 1 must transmit an access request for transfer of data to the main storage 2 through the memory access control apparatus 3. The data read from the main storage 2 is transferred to an area in the buffer storage 100, which is defined by tag information for indicating the status of the buffer storage 100 stored in the first tag control circuit (TAG1) 110. After completion of the data transfer, the central processor 1 is capable of use of the data just transferred into the buffer storage 100. The data can be directly updated by the central processor 1. Furthermore, when a new data transfer request to the same area occurs, the updated data must be removed from the area in the buffer storage 100 and restored to the main storage 2 to maintain the updated result for future use. After that, the new data transfer request may be realized.

The status of use of data stored in the buffer storage 100 is kept in the first tag control circuit 110 as tag information. The buffer storage 100 includes a plurality of data blocks, each composed of for example, 64 bytes which defined the minimum quantity of data for one transfer. The tag information indicates the current status of use of each data block in the buffer storage 100 and thus is updated in response to a change in use.

The data stored in the buffer storage 100 must be the same as that in the main storage 2, because the data stored in the main storage 2 is commonly used in the digital computer system. When the data stored in the main storage 2 is updated due to a store request from the central processor 6 or other units 4 and 5, the data, which is stored in the buffer storage 100 corresponding to the above updated data cannot be used in the central processor 1 as is and must be deemed invalid for use in the central processor 1. Accordingly, the central processor 1 and the tag control circuit 110 must effect an invalidation operation which resets the valid bit of the corresponding tag information. The updated data in the main storage 2 may be again transferred to the buffer storage 100 before this data block may be accessed by the central processor 1. The invalidation operation may also be effected when the data stored in the buffer storage 100 has to be restored to the main storage 2 due to, for example, the generation of a new store request to the same area storing the data therein. Furthermore, the invalidation operation may be effected when a fault or defect arises in the data block in the buffer storage 100.

Due to the possibility of an invalidation operation caused by one of the other units 4 to 6, the central processor 1 must always watch all memory requests existing in the memory access control apparatus. This results in disturbances of operation in the central processor, with a resultant low efficiency of operation of the central processor 1.

In order to overcome the above defect in the buffer invalidation operation in the central processor, the second tag control circuit TAG2 300 is provided in the memory access control apparatus 3 for the central processor 1 and the second tag control circuit TAG2 350 is provided for the central processor unit 6. The tag control circuits 300 and 350 correspond to the tag control circuits 110 and 610, respectively. When the memory access control apparatus 3 receives an access request for storing data from the other units 4 to 6 to the main storage 2, the memory access control apparatus 3 compares the tag information in the tag control circuit 300 with the received access request, and, when the address of the main storage 2 in the received access request matches the address stored in the tag control circuit 300, transmits a buffer invalidation signal including the address of the main storage 2 to the central processor 1. At the same time, the memory access control apparatus 3 effects a buffer invalidation operation on the corresponding tag information in the tag control circuit 300, that is, resets a valid indication signal in the tag information. Upon receipt of the buffer invalidation signal from the memory access control apparatus 3, the central processor 1 may also effect a buffer invalidation operation on the tag information in the tag control circuit 110. As can be seen from the above, by providing the tag control circuit 300 and performing the buffer invalidation operation, the central processor 1 need not inspect all memory access requests existing in the memory access control apparatus 3. This contributes to improving the efficiency of the central processor 1 which includes the buffer storage 100.

However, the prior art mentioned above still requires redundant communications between the central processor and the memory access control apparatus for managing use of the buffer storage. This will be explained immediately below with reference to the drawings.

Figure 2:
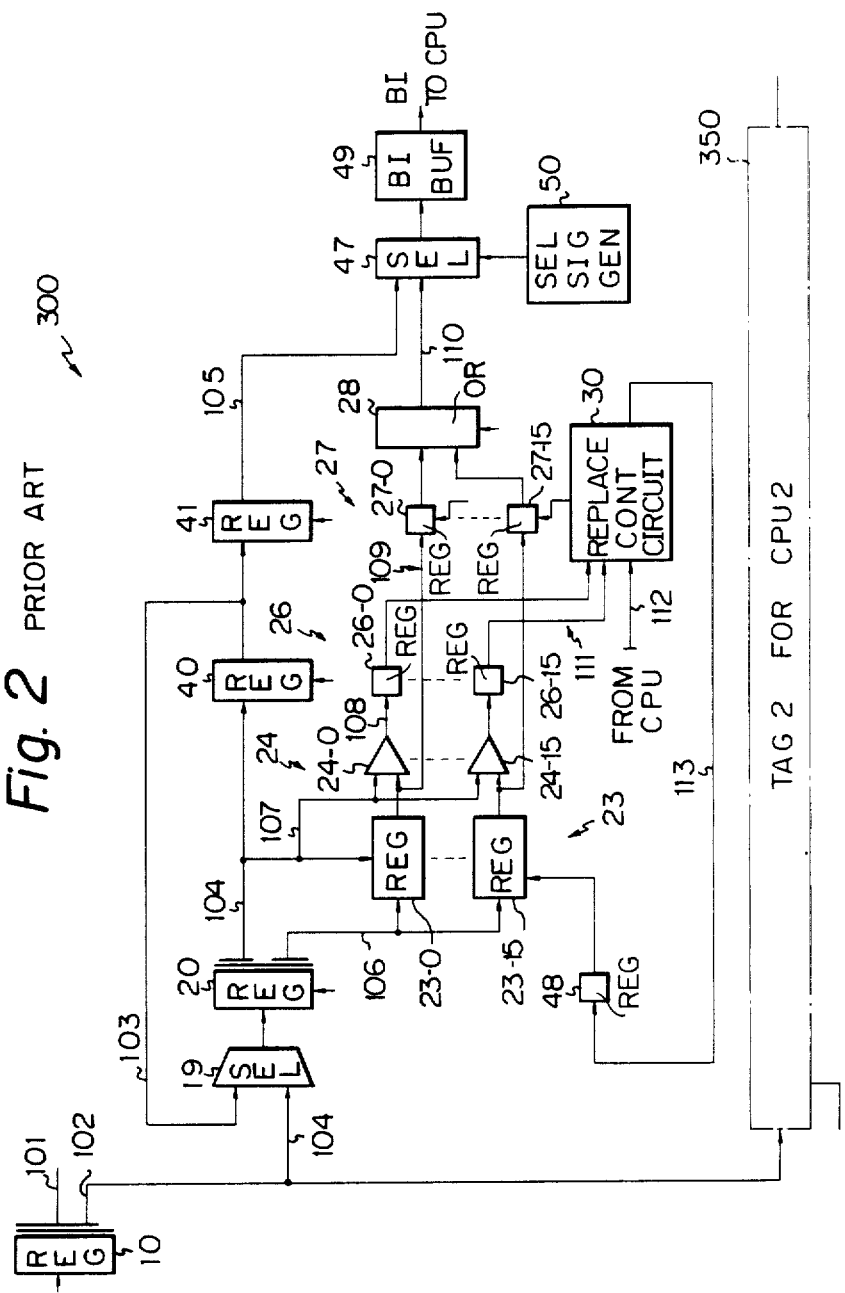
FIG. 2 is a circuit diagram of a tag control circuit in a memory access control apparatus of the prior art.

FIG. 2 is a circuit diagram of the tag control circuits 300 and 350 in the memory access control apparatus 3. A detailed circuit diagram of the tag control circuit 350 is omitted, because the circuit is basically identical to the tag control circuit 300.

In FIG. 2, reference numeral 10 designates a pipeline register receiving access request information, 19 a priority selection circuit, 20 a register receiving the selected access request, and 23 a tag information store unit consisting of 16 way register groups 23-0 to 23-15.

The tag information store way register groups 23-0 to 23-15 correspond to the data blocks in the buffer storage 100. Each of the tag information store way register groups 23-0 to 23-15 consists of a plurality of registers each of which consists of 24 bits, eight upper bits of which indicate the validity or invalidity of the corresponding data block in the buffer storage 100 and 16 lower bits of which indicate the memory address for the data stored in the corresponding data block in the buffer storage 100. Each of the tag information store way register groups 23-0 to 23-15 may be operated independently.

The access request information also consists of 24 bits, eight upper bits of which designate one data block in the buffer storage 100, i.e., the corresponding register in the tag information store way register group of the tag information store way register groups 23-0 to 23-15, and 16 lower bits of which indicate the memory address.

In FIG. 2, reference numeral 24 represents a comparator unit including 16 way comparators 24-0 to 24-15, 26 a register unit consisting of 16 way registers 26-0 to 26-15, and 27 a register unit consisting of 16 way registers 27-0 to 27-15. The comparator unit 24 determines the necessity of operations for updating the valid or invalid bit and for updating the new memory address and also finds parity errors in the access request information. The register unit 26 stores a way signal indicating execution of the above invalidation or the like operation determined by the comparator unit 24. The register unit 27 stores the memory address output from the tag information store unit 23 which concerns the above invalidation operation and outputs the stored memory address to the central processor 1 as a part of the buffer invalidation signal.

In addition, in FIG. 2, reference numeral 28 designates an OR circuit, 30 a replace control circuit, explained in detail later, 40 and 41 registers, 47 a selector, 48 a register, 49 a buffer for temporarily storing the buffer invalidation signals, and 50 a selection signal generation circuit.

The operation of the circuit 300 will now be explained. When the memory access control apparatus 3 receives an access request from one of the central processors 1 and 6, the channel processing unit 4, and the system monitoring unit 5, the memory access control apparatus 3 first inspects the reasonability of the received access request and transmits an access command for the received access request to the main storage 2 to activate an access operation in the main storage 2.

The register 10 is connected to another register (not shown), which may be jointly operated in the pipeline processing system, through a control line 101. The access request information set in the register 10 can be used for control of the pipeline system through the control line 101. Further explanation will be omitted, because this does not directly pertain to the present invention.

The access request information stored in the register 10 is transferred to the register 20 through the priority selection circuit 19. The priority selection circuit 19 receives two signals, one from the register 10 and the other from register 40 and outputs the signal from the register 10 prior to the signal from the register 40 when both signals concurrently exist at inputs thereof.

The memory address included in the access request information stored in the register 20 is supplied to one input terminal in each of the comparators 24-0 to 24-15 through a line 107. Each memory address stored in one register in each group of the register groups 23-0 to 23-15, which is designated by the eight upper bits mentioned above through a line 106, is also supplied to another input terminal at each of the comparators 24-0 to 24-15. Each of the comparators 24-0 to 24-15 checks the parity of the input signals, compares the two input addresses, and outputs a signal indicating the validity of the parity, coincidence of the input address, and the buffer data block validity/invalidity to each of the registers 26-0 to 26-15 through a line 108. Each signal stored in each of the registers 26-0 to 26-15 is supplied to the replace control circuit 30.

Figure 3B:
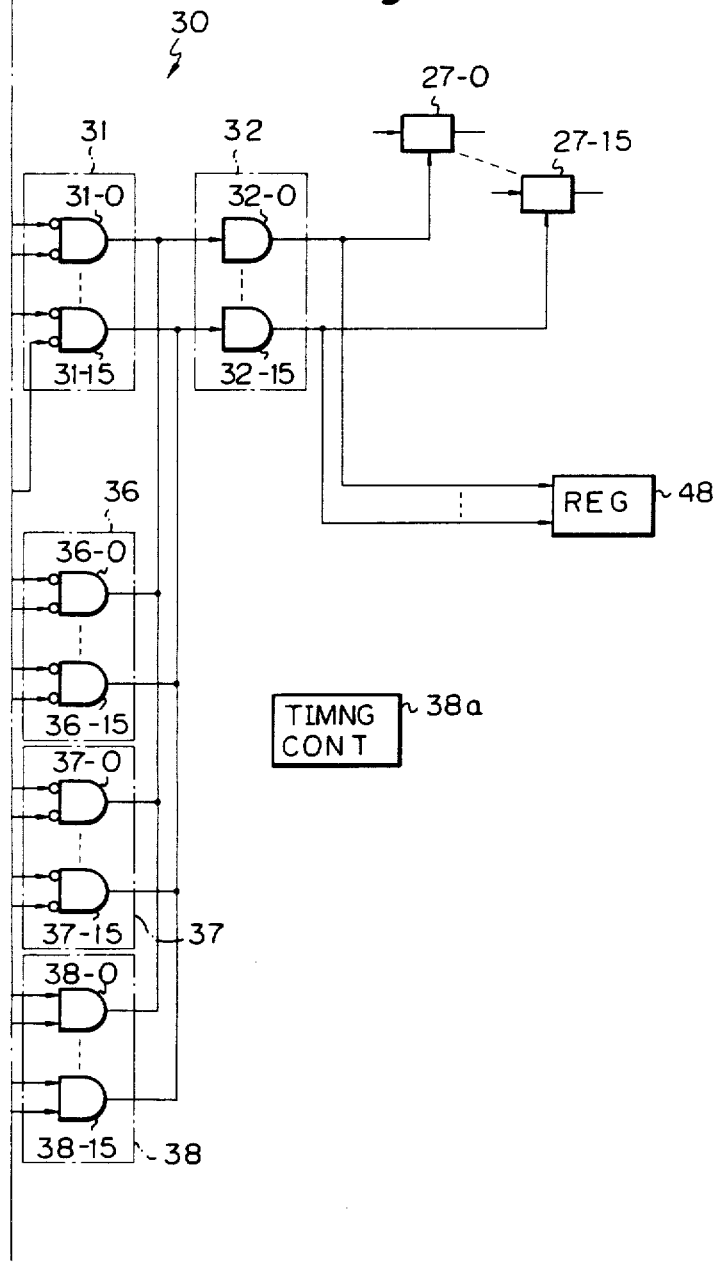

FIG. 3 is a circuit diagram of the replace control circuit 30 and other related circuits 27 and 48. The replace control circuit 30 consists of a NAND gate circuit 31 consisting of 16 NAND gates 31-0 to 31-15, each having inverted input terminals, an AND gate circuit 32 consisting of 16 AND gates 32-0 to 32-15, a register 33, a decoder 34, an AND gate circuit 35 consisting of 16 AND gates 35-0 to 35-15, each having inverted and non-inverted output terminals, a NAND gate circuit 36 consisting of 16 NAND gates 36-0 to 36-15, a NAND gate circuit 37 consisting of 16 NAND gates 37-0 to 37-15, an AND gate circuit 38 consisting of 16 AND gates 38-0 to 38-15, and a timing control circuit 38a.

The replace control circuit 30 receives the signals from the registers 26-0 to 26-15 at the AND gate circuit 35 and effects the following operations (unless an error is detected in the access request) in response to the relationship of the signals from the registers 26-0 to 26-15 and the type of the access request which is currently processed in the memory access control apparatus 3. The access request type may be read access from or a store access to the main storage 2a. Examples of operations are:

Case A: When there exists coincidence of the addresses and the access request is a read access:

Processing for the buffer invalidation to the register groups 23-0 to 23-15 is not required, thus the replace control circuit 30 immediately terminates their operation.

Case B: There exists coincidence of the addresses and the access request is a store access An invalidation operation by the corresponding group of registers in the register groups 23-0 to 23-15 is required. In addition, the tag control circuit 300 must inform the central processor 1 of the necessity for the invalidation operation of the first tag control circuit 110 in the central processor 1.

The above operations are effected as follows:

For the buffer invalidation operation in the tag control circuit 300, the replace control circuit 30 discriminates the way (the specific data block in the buffer storage) to be made invalid with reference to the contents of the registers 26-0 to 26-15 and the store access request at the gate circuits 38 and 32. That is, the AND gate 38 receives a store request valid signal ST-VAL and address match signals TAG2-MCH0 to TAG2-MCH15 stored in the registers 26-0 to 26-15 and outputs one high level signal to the AND gate 32. The replace control circuit 30 stores a way-invalidation signal from the AND gate 32 in the register 48. The access request in the register 20 is loaded to the register 40 through a line 104. After a few clock cycles elapse, this access request in the register 40 is again loaded into the register 20 through a line 103 and the selection circuit 19, under the control of the timing control circuit 38a. Then, the valid bit in the corresponding register in the group of the register groups 23-0 to 23-15 designated by the content stored in the register 48 is reset from one ("1") to zero ("0"), which indicates an invalid status. The memory address stored in the corresponding register in the group of the register groups 23-0 to 23-15 is transferred to the corresponding register of the registers 27-0 to 27-15. The memory address stored in the corresponding register of the registers 27-0 to 27-15 which forms a part of the buffer-invalidation signal is transmitted to the central processor 1 through the OR circuit 28, the selector 47, and the buffer circuit 49.

Case C: When coincidence of the addresses is not detected and the access request is the read access:

An operation for updating the content in the tag information store registers in the register groups 23-0 to 23-15 is required. The operation is as follows. The replace control circuit 30 receives an updating way signal CPUO-BS-WAY from the central processor 1 at the register 33. The updating way signal is decoded at the decoder 34 and output to the register 48 through the gate circuits 31 and 32. A new main storage memory address stored in the register 20 is stored in the register in the corresponding register group of the register groups 23-0 to 23-15 designated by the content of the register 48.

In addition, an operation for informing the main storage memory address to the corresponding central processor 1 is required in the tag control circuit 300 to effect the invalidation operation in TAG1 in the central processor. The above operation in the tag control circuit 300 is similar to that described in the above-mentioned case B.

Case D: When there is no coincidence between the address from the central processors 1 and 6 or the other elements 4 and 5 and the addresses stored in the registers in the register groups 23-0 to 23-15, and the access request is a store access:

No operation for invalidation is required.

In the above cases B and C, when a parity error is detected in the comparators 24-0 to 24-15 or when way-error signals TAG2-WAY-ERR0 to TAG2-WAY-ERR15 are received at the circuit 31, the operation for invalidation and/or updating the registers in the register groups 23-0 to 23-15 cannot be effected, thus the received access request information is retransferred to the corresponding central processor through the registers 40 and 41 and the selector 47 as a buffer-invalidation signal having an erroneous indication.

During the operations of cases B and C, the tag control circuit 300 inhibits reception of new access request information. Accordingly, when the operation for invalidation and/or updating the tag information storing register groups 23-00 to 23-15 is effected in the tag control circuit 300, the central processor 1, which may request a buffer memory invalidation and/or update operation for the tag control circuit 300, must wait until the above operation in the tag control circuit 300 is completed. This clearly reduces the performance of the central processor. This is a disadvantage of the prior art digital computer system, in other words, there is disadvantageous communication between the memory access control apparatus 3 including the tag control circuit(s) and the central processor(s).

In addition, in the prior art tag control circuit, all error information detected in the comparators 24-0 to 24-15 is transmitted through the register 41, the selector 47, and the buffer circuit 49, as mentioned above. The error may be generated due to noise on the lines between the central processors 1 and 6 or the other units 4 and 5 and the memory access control apparatus 3 or in the tag control circuit 300. Errors may be caused by incidential and instantaneous noise, which can be automatically eliminated immediately. Accordingly, the transmission of all error information to the central processor is not always necessary. These extra operations for the above errors in the central processor, result in low efficiency of operation. In the prior art digital computer system, the above disadvantage cannot be eliminated.

Furthermore, in the tag control circuit 300, when only one way error signal TAG2-WAY-ERR-0 to TAG2-WAY-ERR-15 from the central processor, or when only one parity error is detected in the comparator unit 24, is received at the gate circuit 31, the way in question is changed to be invalid even if the way error signal is not correct, for example, when the way error signal is superposed by instantaneous noises. This means that the tag control circuit 300 acts too sensitively with regard to errors. As a result, the data block in the buffer storage 100 corresponding to the way detected as erroneous may be too easily made unavailable. This low reliability of error judgement may result in low availability of the buffer storage 100.

Preferred embodiments of the present invention which can overcome the above disadvantages in the prior art digital computer system will now be explained.

Figure 4:
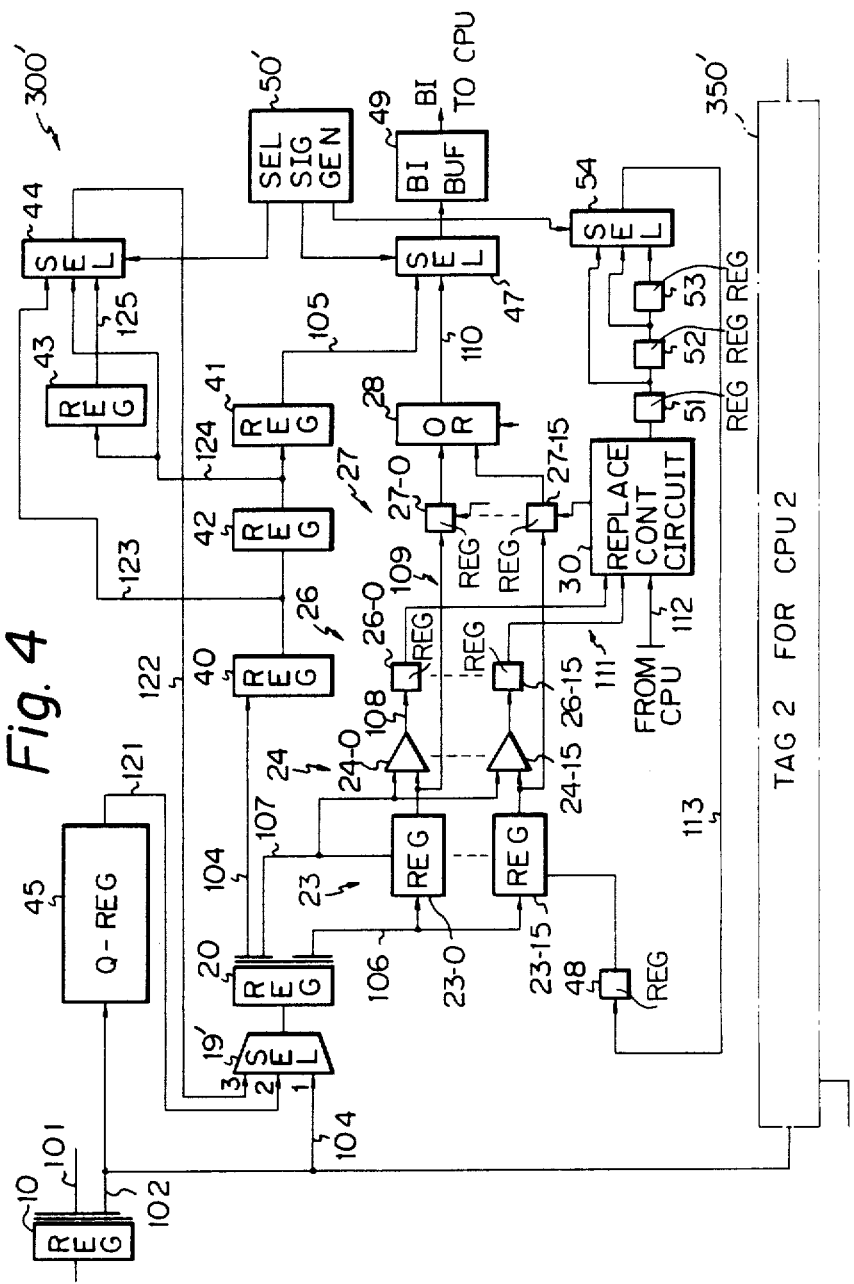
FIG. 4, is a circuit diagram of a tag control circuit in a memory access control apparatus of an embodiment in accordance with the present invention.

FIG. 4 is a circuit diagram of an embodiment of a tag control circuit 300' in a memory access control apparatus 3 in accordance with the present invention. The circuit 300' corresponds to the tag control circuit 300 shown in FIG. 2. In FIG. 4, reference numerals the same as those in FIG. 2 indicate the same circuit elements. The tag control circuit 300' in FIG. 4 further includes a queuing register 45, registers 42 and 43, a selector 44, register units 51 to 53, and a selector 54 in addition to components in the tag control circuit 300 in FIG. 2. Accordingly, the selection signal generation circuit 50' is changed to output additional selection signals to the selectors 44 and 54. The priority selection circuit 19' is also changed to output a highest priority access request in three access requests input therein.

The queuing register 45 simply stores store access requests for later input to the register 20 through the priority selection circuit 19'. The queuing register 45 can hold 10 store access requests in this embodiment.

Figure 5B:
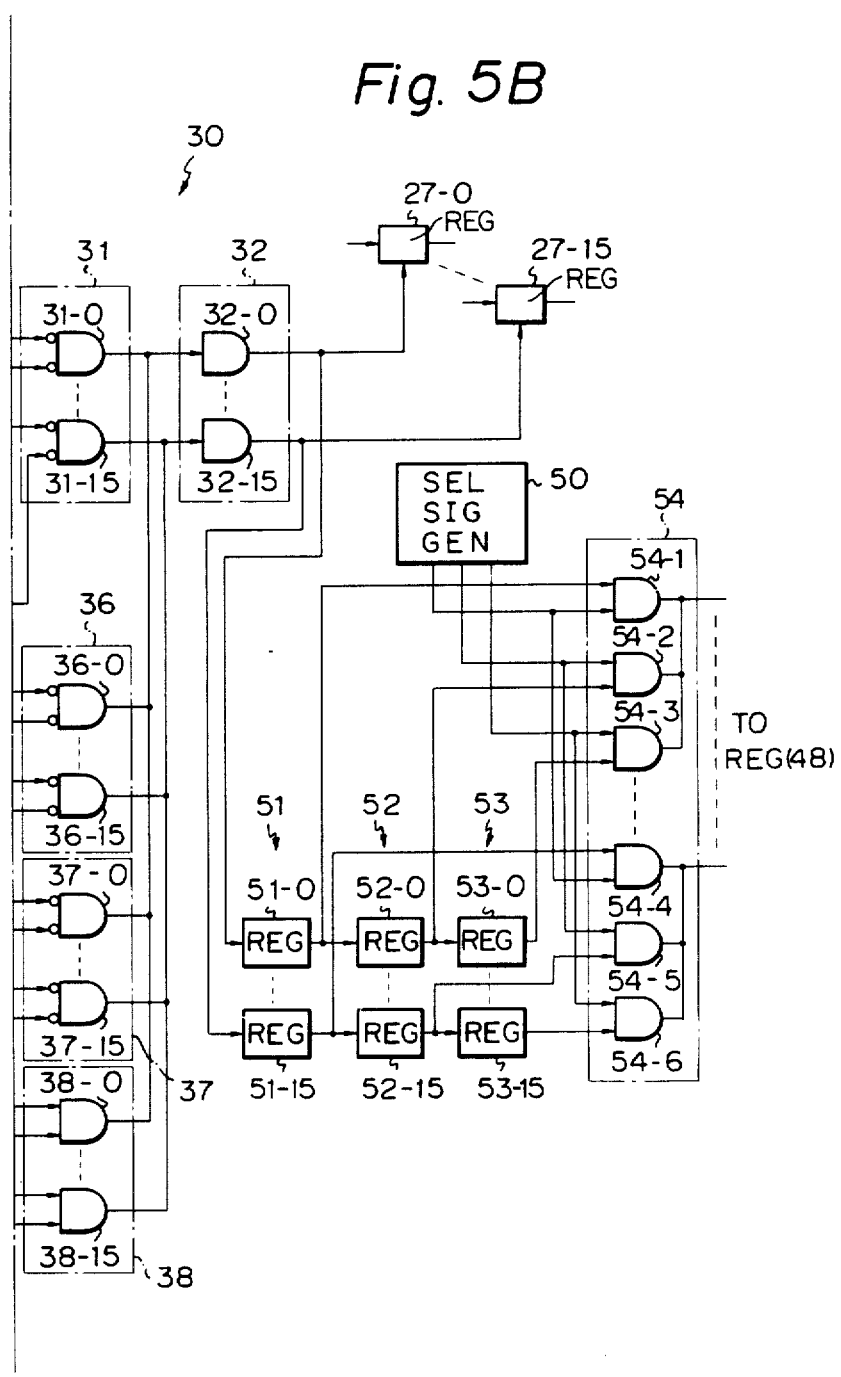

Each of the register units 51 to 53 consists of 16 parallel-connected registers 51-0 to 51-15, 52-0 to 52-15, and 53-0 to 53-15, as shown in FIG. 5. The selector 54 includes a plurality of AND gates 54-1 to 54-6 as also shown in FIG. 5.

In this embodiment, it is assumed that up to three read access requests can be consecutively output from the central processor 1 during a predetermined period. As mentioned above, when the necessity of an invalidation and/or update operation is detected, the access request is loaded in the register 40. In order to handle three consecutive read access requests without delay in the central processor, a replace register unit having three series-connected replace registers 40, 42, and 43 is preferably provided for queuing the access requests. In general, the access requests to be replaced can be shifted from the series-connected registers 40 to 43. However, the contents of the registers 40, 42, and 43 are not always shifted sequentially in the registers 42 and 43. For this reason the registers 40, 42, and 43 are also connected in parallel, and the selector 44, which outputs one of three input signals in response to a selection signal from the selection signal generation circuit 50', is provided.

The above-mentioned concept may be applied to the three series-connected register units 51 to 53 and the selector 54. The register units 51 to 53 may be synchronously operated with the operation of the replace registers 40, 42, and 43.

The operation of the tag control circuit 300' shown in FIGS. 4 and 5 will now be explained. FIGS. 6a to 6g are timing charts of the tag control circuit 300'. When an access request indicating a store request $ST_0$ is supplied to the register 10 at a time of a clock 1 (see FIGS. 6a and 6b), the store request $ST_0$ is stored once in the queuing register 45 at a next clock time $2\tau$ (FIG. 6d). The queuing register 45 simply stores store access requests, functioning in a first-in-first-out (FIFO) manner. The queuing register 45 can hold up to 16 store access requests, which is larger than the steps of the replace register unit of the registers 40, 42, and 43.

When the register 10 receives another access request indicating a read request (or fetch request) $RD_0$ at a time of a clock $2\tau$ (see FIGS. 6a and 6c), the received read access request $RD_0$ is supplied to an input of the priority selection circuit 19' at a time of a clock $3\tau$. Simultaneously, the store access request $ST_0$ output from the register 45 is supplied to another input of the priority selection circuit 19' through a line 121.

When three input signals are applied to the priority selection circuit 19', the priority selection circuit 19' outputs one input signal decided by a priority order. The highest priority is given to the signal on the line 104 output from the register 10. The second highest priority is given to the signal on the line 122 output from the selector 44. The lowest priority is given to the signal on the line 121 output from the register 45.

Accordingly, in this case, the read access request $RD_0$ is selected at the priority selection circuit 19' and supplied to the resister 20 at a time of clock $3\tau$. The store access request $ST_0$ remains in the register 45, because it is not selected.

The read access request $RD_0$, having a starting main storage memory address, for reading data to a data block in the buffer storage 100 is supplied to the comparators 24-0 to 24-15. When an address is found which is the same as the main storage memory address in the read access request $RD_0$, in a tag information storing register in the register groups 23-0 to 23-15, no updating operation is required, as mentioned above for case A. Thus, the operation for the above read access request is immediately terminated.

On the other hand, if no address is found identical to the above main storage memory address, an output of the one of the comparators 24-0 to 24-15 designated by the read access request $RD_0$ is loaded into the corresponding register of the registers 26-0 to 26-16 which indicates the necessity of an update operation to the corresponding register of the tag information storing register groups 23-0 to 23-15. The above output is supplied to the replace control circuit 30.

Upon receipt of the outputs of the registers 26-0 to 26-15, the replace control circuit 30 finds the way for which an invalidation operation is required at the circuits 35, 36, and 32. The found invalid way signal is stored in the corresponding register of the invalid way designation storing registers 51-0 to 51-15. In addition read access request $RD_0$ in the register 20 is transferred to the first stage of the register 40 in the replace register unit.

At a time of clock $3\tau$, a new store access request $ST_1$ is received at the register 10 (FIG. 6b). The received store access request $ST_1$ is added to the register 45 at a time of the next clock $4\tau$.

At the time of clock $4\tau$, only the store access request $ST_0$ stored in the register 45 is again supplied to the priority selection circuit 19' and is loaded into the register 20. When no address is found in the tag information storing register in the register groups 23-0 to 23-15 matching the main storage memory address in the store access request, no invalidation operation is required, as mentioned-above in case D, thus the operation is immediately terminated.

On the other hand, when an address is found that is identical to the main storage memory address, the store access request $ST_0$ is stored in the replace register 40, at a time of clock $5\tau$.

At the time of clock $5\tau$, before loading the store access request $ST_0$ into the register 40, the read access request $REP\text{-}RD_0$ previously loaded into the register 40 is again loaded in the register 20 through the selector 44 and the priority selection circuit 19'. Along with the above operation, the tag registers designating the contents stored in the registers 51-0 to 51-15 are also transferred to the register 48 through the selector 54 due to the control of the selection signal generation circuit 50'. The update operation in the register of the tag information storing register groups 23-0 to 23-15 designated by the content of the register 48, that is, the designated register of the tag information storing register groups 23-0 to 23-15, is loaded with a new read memory address in the register 20. Prior to the above new read memory address store (update) operation to the corresponding register of the tag information storing register groups 23-0 to 23-15, the old memory address is transferred to the corresponding register of the registers 27-0 to 27-15. An operation for transmission of buffer invalidation data to the central processor 1, including the old memory address in the corresponding register of the registers 27-0 to 27-15, is thereafter effected. In the central processor 1, the tag information storing register in the tag control circuit 110, which corresponds to the register of the tag information register groups 23-0 to 23-15 in the tag control circuit 300', may be updated to coincide with the register of the tag information storing register groups 23-0 to 23-15.

At a time of clock $6\tau$, the store access request $REP\text{-}ST_0$ stored in the register 40 is again supplied to the priority selection circuit 19'. At the same time, the store access request $ST_1$ stored in the queuing register 45 is also supplied to the priority selection circuit 19'. In accordance with the above-mentioned priority order, the priority selection circuit 19' chooses the store access request $REP\text{-}ST_0$ prior to the access request $ST_1$. As a result, the invalidation operation of the corresponding register of the tag information storing register groups 23-0 to 23-15 is effected, that is, the valid bit in the corresponding register of the tag information storing register groups 23-0 to 23-15 is reset. At the same time, the memory address stored in the corresponding register of the tag information storing register groups 23-0 to 23-15 is supplied to the corresponding register of the registers 27-0 to 27-15. The buffer invalidation signal is output to the central processor 1, with a resultant update in the tag information storing register in the tag control circuit 110.

At a time of clock $7\tau$, the store access request $ST_1$ is selected at the priority selection circuit 19', thus the invalidation operation for the store access request $ST_1$ may be effected.

During the above operation, the central processor 1 can output the store access request $ST_0$, the read access request $RD_0$, and the store access request $ST_1$ without any wait.

FIGS. 7a to 7f are timing charts illustrating another operation mode in the tag control circuit 300', wherein three consecutive read access requests $RD_0$ to $RD_1$, all of which require the invalidation and/or update operation, are received. At a time of clock $1\tau$, the register 10 receives a first read access $RD_0$. At a next clock $2\tau$, the read access $RD_0$ is loaded in the register 20 and is transferred to the register 40.

Also at the time of clock $2\tau$, the register 10 receives a second read access request $RD_1$. At a next time $3\tau$, the read access request $RD_1$ and the read access request $RD_0$ stored in the register 40 are input to the priority selection circuit 19'. In accordance with the priority order mentioned above, the read access request $RD_1$ is chosen and supplied to the register 20. However, the read access request $RD_1$ must also be stored in the replace register unit. But first, the first read access request $RD_0$ stored in the register 40 is stored in the register 42. After that, the second read access request $RD_1$ in the register 20 is stored in the register 40.

At a time of clock $3\tau$, the register 10 receives a third read access request $RD_2$. At a next clock $4\tau$, the read access request $RD_2$ and the read access request $RD_0$ in the register 42 are supplied to the priority selection circuit 19'. As mentioned above, the third access request $RD_2$ is loaded. The third access request $RD_2$ must also be stored in the replace register unit. Then, the read access request $RD_0$ in the register 42 is further transferred to the register 43, and the read access request $RD_1$ stored in the register 40 is transferred to the register 42. After that, the read access request $RD_2$ is stored in the register 40.

The read access requests $RD_0$ and $RD_1$ stored in the registers 43 and 42 are consecutively loaded to the register 20 from clock $5\tau$ to clock $7\tau$, and the invalidation and update operation thereof is effected. During the above operation, the central processor 1 can output the read access requests $RD_0$ to $RD_2$ consecutively, without any wait. In addition, the central processor 1 will receive only the three buffer invalidation signals at the time from clock $5\tau$ to $7\tau$, which indicate truly necessary invalidation operations.

FIGS. 8a to 8g are timing charts illustrating still another operation mode in the tag control circuit 300'. The register 10 receives a store access request $ST_0$ at a clock time $1\tau$ and read access requests $RD_0$ and $RD_1$ at clock times $2\tau$ and $4\tau$. In this case, it is also assumed that the above access requests require invalidation operations. The operation during the clock time $1\tau$ to $4\tau$ is similar to that of the operation mentioned with reference to FIGS. 6a to 6g.

At a time of clock $6\tau$, the read access request $RD_1$ is stored in the register 40. However, the store access request $ST_0$ is not stored in the replace register unit, thus the store access request $ST_0$ is erased. As a result, the invalidation operation to the tag information storing register groups 23-0 to 23-15 for the store access request $ST_0$ is omitted, and the transmission of the buffer invalidation signal to the central processor 1 is not effected. In the embodiment, the central processor 1 may again output the invalidation request, if required later. This, on one hand, may cause a lower efficiency of the central processor 1, but on other hand, contributes to simplification of the tag control circuit 300'.

The above defect can be easily eliminated by increasing the replace registers or by restoring the store request to the queuing register 45.

Figures 9, 9A:
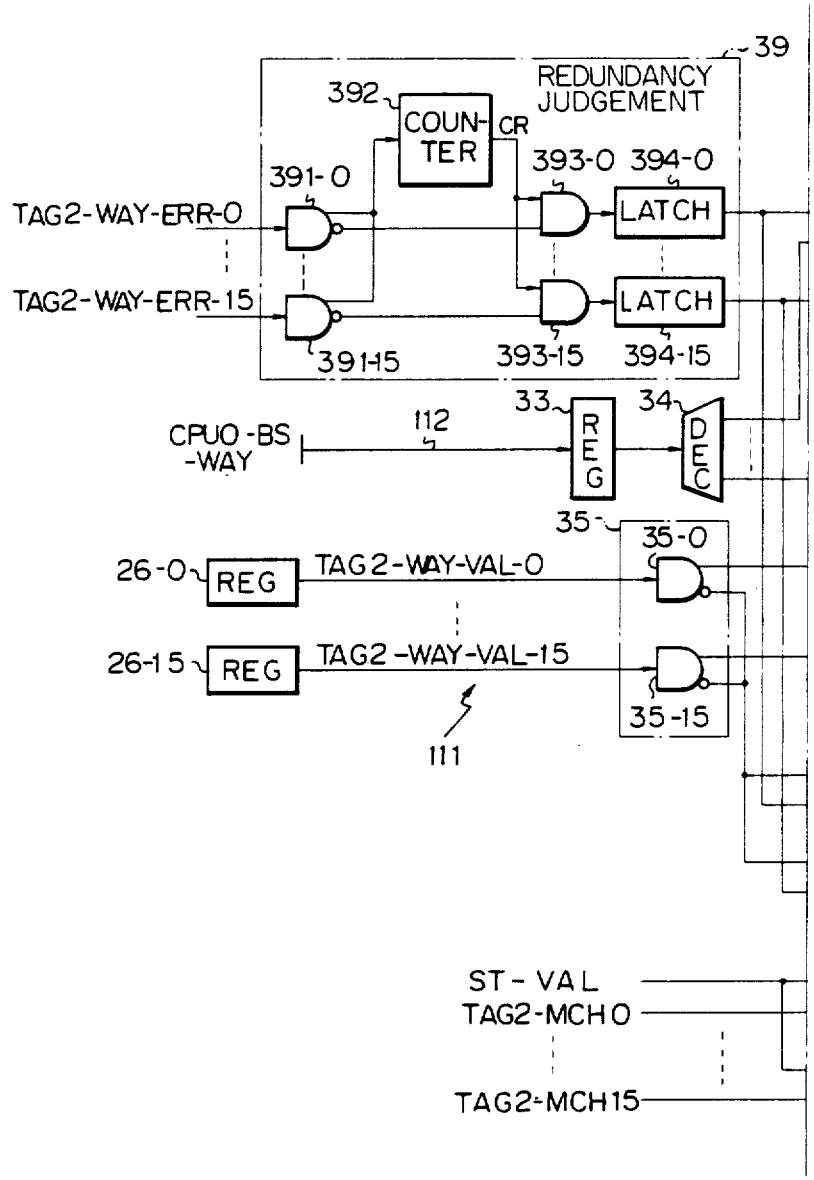
FIGS. 9, 9A and 9B are circuit diagrams of a second embodiment of the replace control circuit in FIG. 4.
Figure 9B:
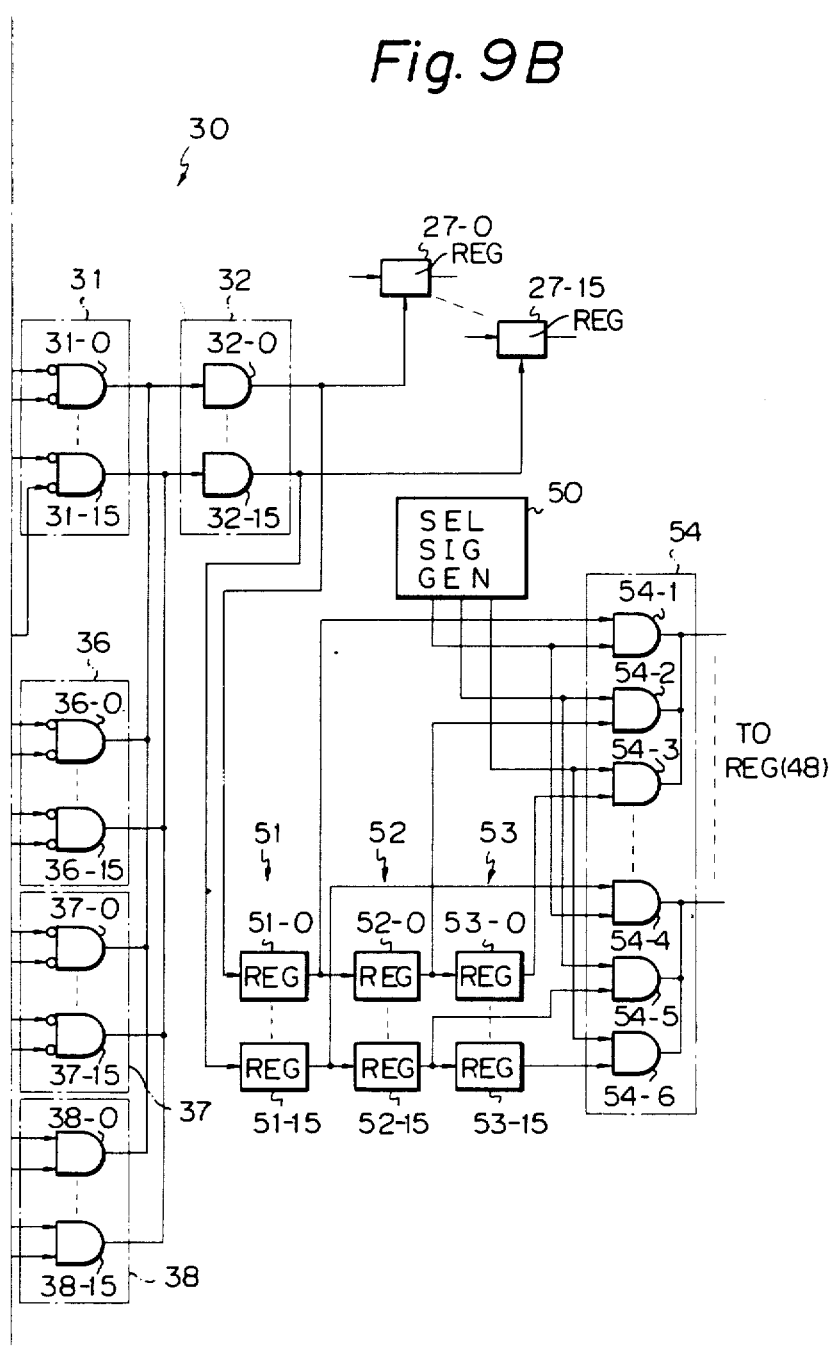

FIG. 9 is a circuit diagram of an embodiment of the replace control circuit 30'. The replace control 30' in FIG. 9 further includes a redundancy judgement circuit 39 consisting of 16 parallel-connected AND gates 391-0 to 391-15, each having inverted and non-inverted output terminals, a counter 392, 16 parallel-connected AND gates 393-0 to 393-15, and 16 parallel-connected latch circuits 394-0 to 394-15, in addition to the replace control circuit 30 shown in FIG. 5.

The redundancy judgement circuit 39 receives way error signals TAG2-WAY-ERR-0 to 15, each of which is low-level when the data block in the buffer storage may be faulty. The counter 392 counts the low-level way error signals with the clock signals and outputs a high level carry-over signal CR to one input terminal of the AND gates 393-0 to 393-15 when the counted value exceeds a predetermined value, for example, 16, during a predetermined period. As a result, at least one of the AND gates 393-0 to 393-15 which receives the high-level output signal from one inverted output terminal of the AND gates 391-0 to 391-15 outputs a high-level signal to the corresponding circuit of the latch circuits 394-0 to 394-15, thus holding the high-level signal in the circuit of the latch circuits 394-0 to 394-15. The high-level signal stored in the corresponding latch circuit designates the data block in the buffer storage 100 to be made invalid for use and is supplied to the gates circuits 31, 36, and 37 for invalidation of the faulty data block. The data block invalidation (way separation) is intended to invalidate the corresponding tag information storing register.

When a true way error signal, for example, TAG-WAY-ERR-0, is supplied to the redundancy judgement circuit 39, a data block invalidation (way separation) signal for way 0 is output from the latch circuit 394-0 after a predetermined period, 16 clocks in this embodiment, elapses. On the other hand, even if some way error signals, the number of which is smaller than the counted number for outputting the carry-over signal CR in the counter, are supplied to the redundancy judgement circuit 39 during the predetermined period, the counter 392 is reset after the predetermined period elapses. Thus, no way separation signals are output from the latch circuits 394-0 to 394-15, because the above instantaneous way error signals may be considered illegal signals which may be generated by noise disturbance or the like. The way separation function is provided for every data block to ensure use of normal data blocks in the buffer storage 100.

Note that, by providing the redundancy judgement circuit 39 in the replace control circuit 30', an illegal invalidation operation would never be caused by one or a few incidental errors. In this embodiment, the invalidation operation for the faulty data block is effected after 16 error signals are received. This means that the redundancy judgement circuit 39 will tolerate error signals due to noise disturbances or the like. Also, this contributes to improved availability of the use of the data blocks.

During the counting operation, the way separation information is not transmitted to the central processor 1. Naturally, the final way separation information, which may mean a true data block fault, is transmitted to the central processor 1. In this regard, redundant communications between the central processor 1 and the tag control circuit 300' are reduced, with a resultant improvement in the operation efficiency of the central processor 1.

In the circuit 39 shown in FIG. 9, the counter 392 is commonly used for counting the way error signal TAG2-WAY-ERR-0 to -15. This, on one hand, contributes circuit simplification, but, on the other hand, may result is some uncertainty of discrimination of the faulty data block. The latter problem may be solved by providing counters on each line between the AND gates 391-0 to -15 and the AND gates 393-0 to -15.

Many widely different embodiments of the present invention may be constructed without departing from the spirit and scope of the present invention. It should be understood that the present invention is not limited to the specific embodiments described in this specification, except as defined in the appended claims.

We claim:

1. A tag control circuit for a memory access control apparatus in a digital computer system, connected between a central processor and a main storage unit, the central processor including a buffer storage temporarily storing data for use therein and an internal tag control circuit for managing the status of the buffer storage, the memory access control apparatus processing access requests to the main storage, said tag control circuit comprising:

tag information storing and updating means for storing and updating tag information indicating status of the buffer storage;

necessity operation determination means for determining whether an invalidation operation for invalidation of the tag information and whether a transmission operation sending invalidation information to the central processor are necessary;

first register pipeline means for storing a plurality of access requests originally issued from the central processor, each of the access requests corresponding to a data block in the buffer storage represented by the tag information operated on by said necessity operation determination means;

second register pipeline means for storing a plurality of invalidation execute information indicating, as previously determined by said necessity operation determination means, whether the invalidation operation should be applied to the tag information corresponding to the access requests stored in said first register pipeline means and for outputting the invalidation execute information to said tag information storing and updating means; and selection means for selecting a selected access request from among a new read access request from the central processor and the access requests in said first register pipeline means and outputting the selected access request to said necessity operation determination means in accordance with a predetermined priority order in which read access requests have the highest priority, said tag information storing and updating means effecting the invalidation operation and the transmission operation sending the invalidation information to the central processor in dependence upon the invalidation execute information stored in said second register pipeline means and upon the determining performed by said necessity operation determination means.

2. A tag control circuit according to claim 1, wherein the buffer storage has a number of data blocks, wherein said tag information storing and updating means includes a number of register groups, the number of register groups being equal to the number of data blocks in the buffer storage, wherein said necessity determination means includes a number of circuits for determining whether the invalidation operation is necessary, the number of circuits being equal to the number of said register groups in said tag information storing and updating circuit, and wherein said second register pipeline means includes a number of registers, the number of which is equal to the number of said register groups in said tag information storing and updating circuit.

3. A tag control circuit according to claim 2, wherein said first register pipeline means includes a number of stages of registers connected in series with each other and in parallel to a selector, and wherein said second register pipeline means includes a number of stages of registers connected in series with each other and in parallel to a selector, the number of stages of registers being the same as the number of stages of said first register pipeline means, said first and second register pipeline means being operated using synchronous timing.

4. A tag control circuit according to claim 3, wherein the central processor outputs a predetermined number of access requests in a predetermined period, and wherein the number of the steps of registers in said first register pipeline means is defined by the number of read access requests output consecutively in the predetermined period by said central processor.

5. A tag control circuit according to claim 1, wherein said tag control circuit further comprises third register pipeline means for storing only write access requests for the main storage before supplying the store access requests to said necessity operation determination means, said third register pipeline means having an output connected to said selection means.

6. A tag control circuit according to claim 5, wherein said selection means determines the selected access request by applying priority as follows: a new read access request before an access request stored in said first register pipeline means, and thereafter a store access request stored in said third register pipeline means.

7. A tag control circuit according to claim 1, wherein said tag control circuit further comprises redundancy adding means for receiving faulty data block detections from the central processor, for performing error discrimination in dependence upon a total number of faulty data block detections within a predetermined period and for outputting data block invalidation signals to said tag information storing and updating means and said second register pipeline means in response to the error discrimination.

8. A tag control circuit according to claim 7, wherein said redundancy adding means includes a counter for counting an error number of faulty data blocks in the buffer storage, and wherein said redundancy adding means outputs an invalidation signal when the error number exceeds a predetermined value during the predetermined period.

9. A tag control circuit according to claim 8, wherein said redundancy adding means discriminates error for individual data blocks of the buffer storage.

* * * * *